United States Patent
Rowe et al.

(10) Patent No.: US 10,302,163 B2
(45) Date of Patent: May 28, 2019

(54) CARBON-CARBON COMPOSITE COMPONENT WITH ANTIOXIDANT COATING

(71) Applicant: Honeywell International Inc., Morris Plains, NJ (US)

(72) Inventors: Jeffrey Rowe, Bremen, IN (US); Alan Gomez, Phoenix, AZ (US); Slawomir T. Fryska, Granger, IN (US)

(73) Assignee: Honeywell International Inc., Morris Plains, NJ (US)

( * ) Notice: Subject to any disclaimer, the term of this patent is extended or adjusted under 35 U.S.C. 154(b) by 399 days.

(21) Appl. No.: 15/048,840

(22) Filed: Feb. 19, 2016

(65) Prior Publication Data

US 2016/0333955 A1    Nov. 17, 2016

Related U.S. Application Data (60) Provisional application No. 62/161,109, filed on May 13, 2015.

(51) Int. Cl.
*B32B 3/10* (2006.01)
*F16D 69/02* (2006.01)
(Continued)

(52) U.S. Cl.
CPC .......... *F16D 69/023* (2013.01); *B29C 64/112* (2017.08); *B29C 64/386* (2017.08);
(Continued)

(58) Field of Classification Search
None
See application file for complete search history.

(56) References Cited

U.S. PATENT DOCUMENTS

| 3,028,284 A | 4/1962 | Reeves |
| 3,596,314 A | 8/1971 | Krugler |

(Continued)

FOREIGN PATENT DOCUMENTS

| CN | 101511569 A | 8/2009 |
| CN | 103939509 A | 7/2014 |

(Continued)

OTHER PUBLICATIONS

Examination Report from counterpart European Application No. 16167174.8, dated Mar. 23, 2018, 6 pp.

(Continued)

*Primary Examiner* — Christopher M Polley
(74) *Attorney, Agent, or Firm* — Shumaker & Sieffert, P.A.

(57) ABSTRACT

In one example, a method including depositing an antioxidant material on a first surface region of a carbon-carbon composite substrate via a print head of a three-dimensional printing device to form a first layer of the antioxidant material on the first surface region of the substrate, and depositing the antioxidant material on a second surface region of the substrate via the print head of the three-dimensional printing device to form a second layer of the antioxidant material on the second surface region. The method may be, for example, a method for forming a carbon-carbon composite component including an antioxidant coating, the antioxidant coating including the first layer and second layer of the antioxidant material.

13 Claims, 5 Drawing Sheets

(51) Int. Cl.

| | | |
|---|---|---|
| C04B 35/83 | (2006.01) | |
| C04B 41/89 | (2006.01) | |
| C04B 41/00 | (2006.01) | |
| C04B 41/52 | (2006.01) | |
| B29C 64/112 | (2017.01) | |
| B29C 64/386 | (2017.01) | |
| B33Y 10/00 | (2015.01) | |
| B33Y 30/00 | (2015.01) | |
| B33Y 50/02 | (2015.01) | |
| B33Y 80/00 | (2015.01) | |
| B29L 31/16 | (2006.01) | |
| C04B 111/00 | (2006.01) | |

(52) U.S. Cl.
CPC ............ *C04B 35/83* (2013.01); *C04B 41/009* (2013.01); *C04B 41/52* (2013.01); *C04B 41/89* (2013.01); *B29L 2031/16* (2013.01); *B33Y 10/00* (2014.12); *B33Y 30/00* (2014.12); *B33Y 50/02* (2014.12); *B33Y 80/00* (2014.12); *C04B 2111/00362* (2013.01); *C04B 2111/00982* (2013.01); *C04B 2235/6026* (2013.01)

(56) References Cited

U.S. PATENT DOCUMENTS

| | | |
|---|---|---|
| 3,703,255 A | 11/1972 | Wade |
| 3,975,128 A | 8/1976 | Schluter |
| 3,982,877 A | 9/1976 | Wyeth et al. |
| 4,264,556 A | 4/1981 | Kumar et al. |
| 4,428,906 A | 1/1984 | Rozmus |
| 4,756,680 A | 7/1988 | Ishii |
| 4,837,073 A | 6/1989 | McAllister et al. |
| 4,957,585 A | 9/1990 | Semff |
| 5,009,823 A | 4/1991 | Kromrey |
| 5,137,663 A | 8/1992 | Conaway |
| 5,137,755 A | 8/1992 | Fujikawa et al. |
| 5,147,588 A | 9/1992 | Okura et al. |
| 5,178,705 A | 1/1993 | Kimbara et al. |
| 5,187,001 A | 2/1993 | Brew |
| 5,242,746 A | 9/1993 | Bommier et al. |
| 5,283,109 A | 2/1994 | Kaplan et al. |
| 5,306,448 A | 4/1994 | Kromrey |
| 5,382,392 A | 1/1995 | Prevorsek et al. |
| 5,516,271 A | 5/1996 | Swenor et al. |
| 5,518,385 A | 5/1996 | Graff |
| 5,576,358 A | 11/1996 | Lem et al. |
| 5,686,144 A | 11/1997 | Thebault et al. |
| 5,728,345 A | 3/1998 | Hlavaty et al. |
| 5,759,622 A | 6/1998 | Stover |
| 5,962,135 A | 10/1999 | Walker et al. |
| 6,054,082 A | 4/2000 | Heide et al. |
| 6,093,482 A | 7/2000 | Park et al. |
| 6,110,268 A | 8/2000 | Gross et al. |
| 6,214,279 B1 | 4/2001 | Yang et al. |
| 6,221,475 B1 | 4/2001 | Domergue et al. |
| 6,245,424 B1 | 6/2001 | Lau et al. |
| 6,261,486 B1 | 7/2001 | Sulzbach et al. |
| 6,267,920 B1 | 7/2001 | Arakawa et al. |
| 6,305,925 B1 | 10/2001 | Cassani |
| 6,325,608 B1 | 12/2001 | Shivakumar et al. |
| 6,358,565 B1 | 3/2002 | Krenkel et al. |
| 6,372,166 B1 | 4/2002 | Cassani |
| 6,455,159 B1 | 9/2002 | Walker et al. |
| 6,471,800 B2 | 10/2002 | Jang et al. |
| 6,508,970 B2 | 1/2003 | Chandra |
| 6,521,152 B1 | 2/2003 | Wood et al. |
| 6,537,470 B1 | 3/2003 | Wood et al. |
| 6,555,173 B1 | 4/2003 | Forsythe et al. |
| 6,578,474 B1 | 6/2003 | Sasaki |
| 6,726,753 B2 | 4/2004 | Kouchouthakis et al. |
| 6,749,937 B2 | 6/2004 | Gray |
| 6,756,121 B2 | 6/2004 | Forsythe et al. |
| 6,884,467 B2 | 4/2005 | Walker et al. |
| 6,886,668 B2 | 5/2005 | Kouchouthakis et al. |
| 6,896,968 B2 | 5/2005 | Golecki |
| 6,939,490 B2 | 9/2005 | La Forest et al. |
| 7,025,913 B2 | 4/2006 | La Forest et al. |
| 7,052,632 B2 | 5/2006 | Lavasserie et al. |
| 7,063,870 B2 | 6/2006 | La Forest et al. |
| 7,118,805 B2 | 10/2006 | Walker et al. |
| 7,141,207 B2 | 11/2006 | Jandeska, Jr. et al. |
| 7,172,408 B2 | 2/2007 | Wood et al. |
| 7,198,739 B2 | 4/2007 | La Forest et al. |
| 7,252,499 B2 | 8/2007 | La Forest et al. |
| 7,258,896 B2 | 8/2007 | Deckard et al. |
| 7,318,717 B2 | 1/2008 | Wood et al. |
| 7,332,112 B1 | 2/2008 | Shivakumar et al. |
| 7,332,195 B2 | 2/2008 | Arico et al. |
| 7,370,738 B2 | 5/2008 | Vollweiter |
| 7,393,370 B2 | 7/2008 | Peterman, Jr. et al. |
| 7,423,072 B2 | 9/2008 | Lee et al. |
| 7,442,024 B2 | 10/2008 | La Forest et al. |
| 7,556,490 B2 | 7/2009 | Wicker et al. |
| 7,589,868 B2 | 9/2009 | Velde et al. |
| 7,632,435 B2 | 12/2009 | Simpson et al. |
| 7,681,627 B2 | 3/2010 | Schmitz et al. |
| 7,698,817 B2 | 4/2010 | Khambete et al. |
| 7,700,014 B2 | 4/2010 | Simpson et al. |
| 7,727,448 B2 | 6/2010 | Boutefeu et al. |
| 7,867,566 B2 | 1/2011 | Blanton et al. |
| 7,972,129 B2 | 7/2011 | O'Donoghue |
| 8,002,919 B2 | 8/2011 | Johnson et al. |
| 8,492,466 B2 | 7/2013 | Abe et al. |
| 8,501,033 B2 | 8/2013 | Southwell et al. |
| 8,592,519 B2 | 11/2013 | Martinoni |
| 8,597,772 B2 | 12/2013 | La Forest et al. |
| 8,742,014 B2 | 6/2014 | Hongo |
| 2001/0019798 A1 | 9/2001 | Kajiura et al. |
| 2001/0030094 A1 | 10/2001 | Pareti |
| 2002/0022570 A1 | 2/2002 | Reynolds, III et al. |
| 2002/0047227 A1 | 4/2002 | Matsumoto |
| 2003/0003286 A1 | 1/2003 | Gruber et al. |
| 2003/0021901 A1 | 1/2003 | Gasse |
| 2003/0030188 A1 | 2/2003 | Spengler |
| 2003/0111752 A1 | 6/2003 | Wood et al. |
| 2003/0143436 A1 | 7/2003 | Forsythe et al. |
| 2003/0214064 A1 | 11/2003 | Shin et al. |
| 2004/0020728 A1 | 2/2004 | Koucouthakis et al. |
| 2004/0113302 A1 | 6/2004 | La Forest et al. |
| 2004/0168612 A1 | 9/2004 | Saver |
| 2004/0202896 A1 | 10/2004 | Gray |
| 2004/0219510 A1 | 11/2004 | Lowery et al. |
| 2006/0046059 A1 | 3/2006 | Arico et al. |
| 2006/0069176 A1 | 3/2006 | Bowman et al. |
| 2006/0127599 A1 | 6/2006 | Wojak |
| 2006/0197244 A1 | 9/2006 | Simpson et al. |
| 2006/0232392 A1 | 10/2006 | Emmett et al. |
| 2006/0267252 A1 | 11/2006 | Steinmann et al. |
| 2006/0279012 A1 | 12/2006 | Simpson et al. |
| 2007/0063378 A1 | 3/2007 | O'Donoghue |
| 2007/0132126 A1 | 6/2007 | Shao et al. |
| 2007/0154712 A1 | 7/2007 | Mazany et al. |
| 2007/0218208 A1 | 9/2007 | Walker et al. |
| 2008/0318010 A1 | 12/2008 | Wozniak et al. |
| 2009/0145314 A1 | 6/2009 | Botrie |
| 2009/0169825 A1 | 7/2009 | Farmer et al. |
| 2009/0176034 A1 | 7/2009 | Ruuttu et al. |
| 2009/0229926 A1 | 9/2009 | Schaefer |
| 2009/0298962 A1 | 12/2009 | Studer et al. |
| 2009/0321979 A1 | 12/2009 | Hiraide |
| 2010/0000070 A1 | 1/2010 | La Forest et al. |
| 2011/0030940 A1 | 2/2011 | Takeda |
| 2012/0082559 A1* | 4/2012 | Guglielmin ............ B82Y 30/00 416/241 R |
| 2012/0104659 A1 | 5/2012 | La Forest et al. |
| 2012/0251829 A1 | 10/2012 | Xu et al. |
| 2012/0304449 A1 | 12/2012 | Jackson et al. |
| 2013/0157826 A1 | 6/2013 | Preckel et al. |
| 2013/0174969 A1 | 7/2013 | Karb et al. |
| 2013/0237636 A1 | 9/2013 | Strauss |
| 2013/0244039 A1 | 9/2013 | Peters et al. |
| 2013/0248304 A1 | 9/2013 | Lee et al. |

(56) References Cited

U.S. PATENT DOCUMENTS

| | | | |
|---|---|---|---|
| 2013/0284548 A1 | 10/2013 | Guether et al. |
| 2013/0323473 A1 | 12/2013 | Dietsch et al. |
| 2014/0134335 A1 | 5/2014 | Pridoehl et al. |
| 2014/0194328 A1 | 7/2014 | Alessi |
| 2014/0298728 A1 | 10/2014 | Keshavan |
| 2014/0356612 A1 | 12/2014 | Sano et al. |
| 2014/0361460 A1 | 12/2014 | Mark |
| 2015/0018136 A1 | 1/2015 | Goldstein et al. |
| 2015/0093506 A1 | 4/2015 | Bucci et al. |
| 2015/0321187 A1 | 11/2015 | Dias et al. |
| 2016/0046803 A1 | 2/2016 | Boday et al. |
| 2016/0082695 A1 | 3/2016 | Swartz et al. |
| 2016/0151982 A1 | 6/2016 | Sand |
| 2016/0346997 A1 | 12/2016 | Lewis et al. |

FOREIGN PATENT DOCUMENTS

| | | |
|---|---|---|
| CN | 104451606 A | 3/2015 |
| CN | 104496508 A | 4/2015 |
| DE | 102007057450 A1 | 6/2009 |
| DE | 102014006432 A1 | 11/2015 |
| EP | 1165191 A1 | 1/2002 |
| EP | 1724245 A1 | 11/2006 |
| EP | 1731292 A2 | 12/2006 |
| EP | 2295227 A2 | 3/2011 |
| EP | 2450170 A2 | 9/2012 |
| EP | 3095593 A1 | 11/2016 |
| GB | 2386951 | 1/2003 |
| GB | 2470098 | 11/2010 |
| JP | 2013088196 | 5/2013 |
| JP | 5352893 B2 | 11/2013 |
| WO | 9908980 A1 | 2/1999 |
| WO | 0054852 A1 | 9/2000 |
| WO | 2004050319 A1 | 6/2004 |
| WO | 2004052629 A1 | 6/2004 |
| WO | 2004106766 | 12/2004 |
| WO | 2006033373 A1 | 3/2006 |
| WO | 2006086167 A1 | 8/2006 |
| WO | 2013126981 A1 | 9/2013 |
| WO | 2014035382 A1 | 3/2014 |
| WO | 2014060430 A1 | 4/2014 |
| WO | 2014134224 A2 | 9/2014 |
| WO | 2014153535 A2 | 9/2014 |
| WO | 2014174540 A1 | 10/2014 |
| WO | 2014175625 A1 | 10/2014 |
| WO | 2015006697 A1 | 1/2015 |
| WO | 2015038260 A2 | 3/2015 |
| WO | 2015053658 A1 | 4/2015 |

OTHER PUBLICATIONS

Response to Extended Search Report dated Sep. 29, 2016, from counterpart European Application No. 16167174.8, filed Jan. 13, 2017, 10 pp.
Extended Search Report from counterpart European Application No. 16167174.8-1371, dated Sep. 29, 2016, 9 pp.
Senese, "MarkForged Lets you 3D Print with Carbon Fiber and Kevlar on a Budget," Makezine, retrieved from URL: http: //makezine.com/ 2015/01/ 15/3d-printed-carbon-fiber-markforged and accessed Nov. 11, 2016, Jan. 15, 2015, 6 pp.
A. Fatz, et al., "Manufacture of Functionally Gradient Carbon-Carbon Composites," Proceedings of the 17 th Technical Conference of the American Society of Composites, Oct. 21-23, 2002, Purdue University, West Lafayette, Ind., 9 pp.
Tekinalp et al., "Highly oriented carbon fiber-polymer composites via additive manufacturing," Composites Science and Technology, ElSevier, Oct. 9, 2014, 7 pp.
"Application of nanoparticles could improve ALM components," technical trends ALM, MPR, Elsevier Ltd., Nov.-Dec. 2012, 3 pp.
"Arevo Labs introduces carbon fiber reinforced polymers to 3D print ultra-strong parts," 3D printer and 3D printing news, www.3ders.org, Mar. 24, 2014, 9 pp.
"Carbon-fiber filled Nylon—A Material Alternative," Northwest Rapid Manufacturing, Jun. 25, 2012, 3 pp.
"Mark One, the world's first carbon fiber 3D printer now available for pre-order," 3D printer and 3D printing news, www.3ders.org, Feb. 18, 2014, 11 pp.
Black, "3D Printing continuous carbon fiber composites?," Composites World, Gardner Business Media, Inc., May 1, 2014, 8 pp.
Crandall, "Where Will Additive Manufacturing Take Us?," APICS Magazine, Jan./Feb. 2013, 3 pp.
Divyashree et al., "Design, Implement and Develop CNT-Metal Composite PCB Wiring Using a Metal 3D Printer," International Journal of Scientific & Engineering Research, vol. 5, No. 5, May 2014, 5 pp.
Krassenstein, "3DXTech's Carbon Nanotube 3D Printer Filament is Here: Exclusive images and details," 3DXTECH, May 13, 2014, 2 pp.
Thryft, "3D Printing High-Strength Carbon Composites Using PEEK, PAEK," Design News, Engineering Materials, Apr. 14, 2014, 5 pp.
Vie et al., "Inkjet printing of 200 nm monodisperse carbon nanoparaticles: from nanoparticles synthesis to smart ink formulation," NSTI—Nanotech, vol. 2, May 2013, pp. 243-246.
U.S. Appl. No. 14/711,508, by Honeywell International Inc. (Inventors: Slawomir T. Fryska et al.), filed May 13, 2015.
U.S. Appl. No. 14/711,550, by Honeywell International Inc. (Inventors: Slawomir T. Fryska et al.), filed May 13, 2015.
U.S. Appl. No. 14/711,590, by Honeywell International Inc. (Inventors: Jeffrey Troester et al.), filed May 13, 2015.
U.S. Appl. No. 14/788,217, by Honeywell International Inc. (Inventors: Mark L. La Forest et al.), filed Jun. 30, 2015.
U.S. Appl. No. 14/854,993, by Honeywell International Inc. (Inventors: Mark L. La Forest et al.), filed Sep. 15, 2015.
U.S. Appl. No. 14/954,783, by Honeywell International Inc. (Inventors: Mark L. La Forest et al.), filed Nov. 30, 2015.
U.S. Appl. No. 14/711,426, by Honeywell International Inc. (Inventors: Jeffrey Troester et al.), filed May 13, 2015.
Windhorst et al., "Carbon-carbon composites: a summary of recent developments and applications," Materials and Design, vol. 18, Issue 1, 1997, 5 pp. (Applicant points out, in accordance with MPEP 609.04(a), that the year of publication,1997, is sufficiently earlier than the effective U.S. filing date, so that the particular month of publication is not in issue.).
Response to Extended Search Report dated Mar. 23, 2018, from counterpart European Application No. 16167174.8, filed Jul. 11, 2018, 12 pp.
Callister, "Chapter 16: Composites," Mateirals Science and Engineering, John Wiley & Sons, Inc., Seventh Edition, Chapter 16: pp. 577-620, 2007, (Applicant points out, in accordance with MPEP 609.04(a), that the year of publication, 2007, is sufficiently earlier than the effective U.S. filing date, so that the particular month of publication is not in issue.).

* cited by examiner

CARBON-CARBON COMPOSITE COMPONENT WITH ANTIOXIDANT COATING

This application claims the benefit of U.S. Provisional Application No. 62/161,109, by Rowe et al., and filed May 13, 2015, which is incorporated herein by reference in its entirety.

TECHNICAL FIELD

The disclosure relates to carbon-carbon composite materials.

BACKGROUND

Carbon fiber-reinforced carbon materials, also referred to as carbon-carbon (C—C) composite materials, are composite materials that include carbon fibers reinforced in a matrix of carbon material. The C—C composite materials can be used in many high temperature applications. For example, the aerospace industry employs C—C composite materials as friction materials for commercial and military aircraft, such as brake friction materials.

SUMMARY

Devices, systems, and techniques for forming carbon-carbon composite components including antioxidant coatings, and those components resulting therefrom, are described. In some examples, a carbon-carbon composite component may include an antioxidant coating over at least a portion of the surface of a carbon-carbon substrate, e.g., over a non-working surface region of the substrate, which may be a non-friction surface region. In some examples, the antioxidant coating may be formed by an additive manufacturing process and may include a plurality of individual layers of antioxidant material. Each of the plurality of individual layers may be formed by depositing the antioxidant material on (either directly or indirectly) desired surface region of the carbon-carbon substrate by a print head of a three-dimensional (3D) printing device. For example, the individual layers of antioxidant material may be sequentially formed on a layer-by-layer basis in three-dimensions on the carbon-carbon composite substrate. Throughout the formation of the individual antioxidant layers, the three-dimensional position of the print head in may be under automated control to produce an antioxidant coating of a desired 3D geometry over a desired surface region of the carbon-carbon substrate.

In one aspect, the disclosure is directed to a method for forming a carbon-carbon composite component including an antioxidant coating, the method comprising depositing an antioxidant material on a first surface region of a carbon-carbon composite substrate via a print head of a three-dimensional printing device to form a first layer of the antioxidant material on the first surface region of the substrate and depositing the antioxidant material on a second surface region of the substrate via the print head of the three-dimensional printing device to form a second layer of the antioxidant material on the second surface region, wherein the antioxidant coating includes the first layer and second layer of the antioxidant material.

In another aspect, the disclosure is directed to a system system comprising a three-dimensional print head configured to deposit an antioxidant material on a carbon-carbon composite component to form an antioxidant coating; and a controller configured to control the print head to deposit the antioxidant material on a first surface region of the carbon-carbon composite substrate to form a first layer of the antioxidant material on the first surface region of the substrate, and control the print head to deposit the antioxidant material on a second surface region of the substrate via the print head of the three-dimensional printing device to form a second layer of the antioxidant material on the second surface region, wherein the antioxidant coating includes the first layer and the second layer.

In another aspect, the disclosure is directed to an article comprising a carbon-carbon composite substrate; and an antioxidant coating on a surface of the substrate, wherein the antioxidant coating includes a first layer of the antioxidant material on a first surface region of the substrate, and a second layer of the antioxidant material on a second surface region, wherein each of the first layer and second layer are formed by depositing the antioxidant material via a print head of a three-dimensional printing device.

The details of one or more examples are set forth in the accompanying drawings and the description below. Other features, objects, and advantages of the disclosure will be apparent from the description and drawings, and from the claims.

DETAILED DESCRIPTION

As described, some examples of the disclosure relate to carbon-carbon composite components. C—C composite components used, for example, in aerospace applications such as brake discs, may be formed from carbon fiber preforms that have been densified using a variety of densification techniques. For example, a carbon fiber preform may be formed by layering fabric sheets formed of woven or nonwoven carbon fiber, which may be then be densified by infiltrating the preform with liquid pitch using vacuum pressure infiltration (VPI) and/or resin transfer molding (RTM) followed by carbonization of the pitch to achieve a C—C composite material exhibiting a desired final density. Additionally or alternatively, chemical vapor infiltration (CVI) or chemical vapor deposition (CVD) may be used to densify the fabric preform or other preform. In the case of an aircraft brake disc, in some examples, the carbonized preform may take the form of an annular ring, although other shapes may also be used.

In some examples, carbon-carbon composite components may exhibit relatively low resistance to oxidation, by atmospheric oxygen, at elevated temperatures, e.g., temperatures of 500 degrees Celsius or higher. Such oxidation may not only attack the surface of the carbon-carbon composites but may also enter pores that invariably are present in such structures and oxidize the carbon fibers adjacent to the pores and surfaces of the pores, thereby potentially weakening the composites. Thus, the oxidation of carbon-carbon composite components, particularly when used in high temperature environments (e.g., aircraft brake assemblies), may be a significant contributor to wear of the carbon-carbon composite component.

In some examples, an antioxidant coating may be applied to non-friction surfaces of a carbon-carbon composite brake disc. The application of antioxidant coating may be applied through "line of sight" spraying (e.g., via a bottle and foam dispensing head), dip coating, or brushing. However, difficulties may arise with each of these techniques, where the difficulties may relate to, e.g., achieving full and even coverage across complex geometries of the application surfaces of a carbon-carbon composite brake disc.

For example, while using line of sight application techniques such as spraying, complex part geometries may mask or otherwise block the intended areas to be coated. The masking may result in an antioxidant coating with non-uniform thickness and, in some cases, shield an area of a substrate entirely from a coating being applied. As another example, brushing can result in a non-uniform amount of material being applied to the substrate. During brushing of complex geometries, the coating may only be applied in areas in which the bristles of the brush touch the substrate, thus, limiting brushing's ability, e.g., to apply coatings around sharp corners, inside small radius, and the like.

These techniques for applying such coating, such as line of sight spraying, dip coating, and brushing, may include mixing the coating material in bulk, applying the bulk coating material to a substrate, and then heat treating the coated component to achieve the final chemistry. Uniform bulk mixing and application of consistent concentrations of the bulk mixture to the surface of the carbon-carbon composite substrate to achieve the desired coating chemistry may be difficult. For example, variations in the concentration and bulk application of the coating prior to heat treatment can cause variation in the final chemistry, thus, variation in product reliability and performance.

In accordance with one or more examples of the disclosure, a carbon-carbon composite component may include an antioxidant coating over at least a portion of the surface of a carbon-carbon substrate, e.g., over a non-working surface region of the substrate). The antioxidant coating may be formed by an additive manufacturing process and include one or a plurality of individual layers of antioxidant material. Each of the individual layers may be formed by depositing the antioxidant material on (either directly or indirectly) desired surface region of the carbon-carbon substrate by a print head of a 3D printing device. For example, the individual layers of antioxidant material may be sequentially formed on a layer-by-layer basis in three-dimensions on the carbon-carbon composite substrate. Throughout the formation of the individual antioxidant layers, the 3D position of the print head in may be under automated control to produce an antioxidant coating of a desired 3D geometry over a desired surface region of the substrate.

Examples of the disclosure may provide for one or more benefits. In some examples, the use of 3D printing of antioxidant coatings may allow for greater control over the thickness profile of the antioxidant coating, e.g., compared to that of spraying, brushing, or dip coating. For example, as the print head of a 3D printing device may be able to achieve much more accessibility to intricate areas such as sharp radii, corners, and the like, 3D printing of the individual antioxidant layers may allow for antioxidant coatings with substantially uniform thickness and/or tailored thickness profiles on the surface of the composite substrate.

Additionally or alternatively, the use of 3D printing of antioxidant coatings may allow for the carbon-carbon composite substrate with relatively more complex geometries while still maintaining a substantially uniform coating. Moreover, as 3D printing may allow for better control of chemistry (in some cases even to an atomic level), a more uniform coating chemistry (e.g., from a compositional standpoint) may be achieved by building up small individual layers of the antioxidant material during the printing process instead the bulk application of a coating that results from spraying or brushing.

In some examples, the final coating chemistry may be achieved by thermal processing of the antioxidant material during 3D printing and, in some case, additional heat treatment after the complete antioxidant coating has been formed may not be required. Thermal processing of antioxidant may refer to curing the antioxidant in order to achieve necessary properties that prevent carbon oxidation. In some examples, the curing may be, e.g., either a process of calcination applied to phosphorus based antioxidation systems or a process of chemical conversion applied to ceramic based antioxidation coatings.

Figure 1:
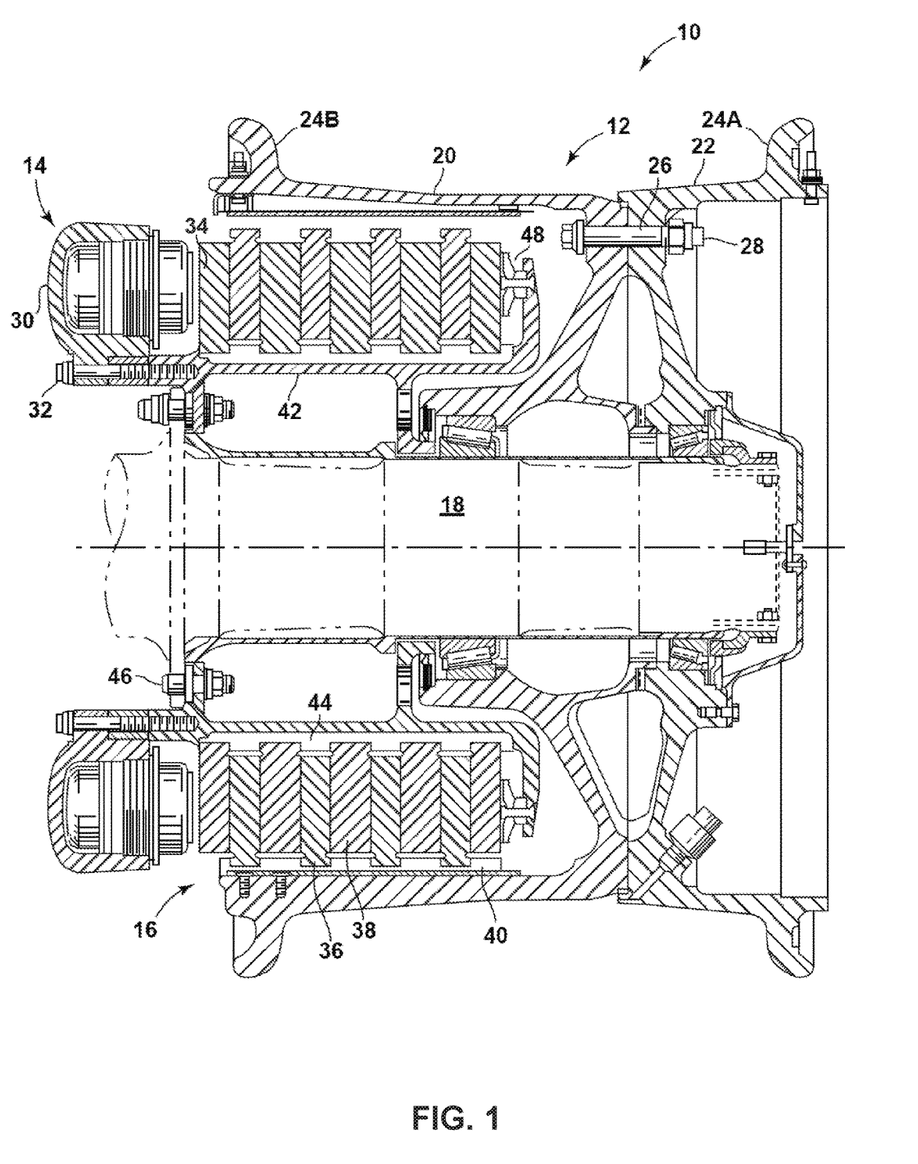
FIG. 1 is a schematic block diagram illustrating an example aircraft brake assembly.

FIG. 1 is a conceptual diagram illustrating an example assembly 10 that may include one or more carbon-carbon composite components formed in accordance with the techniques of this disclosure. For ease of description, examples of the disclosure will be described primarily with regard to aircraft brake discs including an antioxidant coating on a portion of the surface of a densified carbon-carbon composite substrate. However, the carbon-carbon composite components of this disclosure may be used to form components other than aircraft brake discs. For example, the carbon-carbon composite components may be used a friction material in other types of braking applications, as well as in other applications such as, e.g., heat exchangers and heat shields.

In the example of FIG. 1, aircraft brake assembly 10 includes wheel 12, actuator assembly 14, brake stack 16, and axle 18. Wheel 12 includes wheel hub 20, wheel outrigger flange 22, bead seats 24A and 24B, lug bolt 26, and lug nut 28. Actuator assembly 14 includes actuator housing 30, actuator housing bolt 32, and ram 34. Brake stack 16 includes alternating rotor discs 36 and stator discs 38; rotor discs 36 are configured to move relative to stator discs 38. Rotor discs 36 are mounted to wheel 12, and in particular wheel hub 20, by beam keys 40. Stator discs 38 are mounted to axle 18, and in particular torque tube 42, by splines 44. Wheel assembly 10 may support any variety of private, commercial, or military aircraft.

Wheel assembly 10 includes wheel 18, which in the example of FIG. 1 is defined by a wheel hub 20 and a wheel outrigger flange 22. Wheel outrigger flange 22 is mechanically affixed to wheel hub 20 by lug bolts 26 and lug nuts 28. Wheel 12 defines bead seats 24A and 24B. During assembly, an inflatable tire (not shown) may be placed over wheel hub 20 and secured on an opposite side by wheel outrigger flange 22. Thereafter, lug nuts 28 can be tightened on lug bolts 26, and the inflatable tire can be inflated with bead seals 24A and 24B providing a hermetic seal for the inflatable tire.

Wheel assembly 10 may be mounted to an aircraft via torque tube 42 and axle 18. In the example of FIG. 1, torque tube 42 is affixed to axle 18 by a plurality of bolts 46. Torque tube 42 supports actuator assembly 14 and stators 38. Axle 18 may be mounted on a strut of a landing gear (not shown) to connect wheel assembly 10 to an aircraft.

During operation of the aircraft, braking may be necessary from time to time, such as during landing and taxiing. Wheel assembly 10 is configured to provide a braking function to an aircraft via actuator assembly 14 and brake stack 16. Actuator assembly 14 includes actuator housing 30 and ram 34. Actuator assembly 14 may include different types of actuators such as one or more of, e.g., an electrical-mechanical actuator, a hydraulic actuator, a pneumatic actuator, or the like. During operation, ram 34 may extend away from actuator housing 30 to axially compress brake stack 16 against compression point 48 for braking.

Brake stack 16 includes alternating rotor discs 36 and stator discs 38. Rotor discs 36 are mounted to wheel hub 20 for common rotation by beam keys 40. Stator discs 38 are mounted to torque tube 42 by splines 44. In the example of FIG. 1, brake stack 16 includes four rotors and five stators. However, a different number of rotors and/or stators may be included in brake stack 16 in other examples. Further, the relative positions of the rotors and stators may be reverse, e.g., such that rotor discs 36 are mounted to torque tube 42 and stator discs 38 are mounted to wheel hub 20.

Rotor discs 36 and stator discs 38 may provide opposing friction surfaces for braking an aircraft. As kinetic energy of a moving aircraft is transferred into thermal energy in brake stack 16, temperatures may rapidly increase in brake stack 16, e.g., beyond 200 degrees Celsius. With some aircraft, emergency braking (e.g., rejected takeoff) may result in component temperatures in excess of 500 degrees Celsius, and in some cases, even beyond 800 degrees Celsius. As such, rotor discs 36 and stator discs 38 that form brake stack 16 may include robust, thermally stable materials capable of operating at such temperatures.

In one example, rotor discs 36 and/or stator discs 38 are formed of a C—C composite component including an antioxidant coating according to one or more example techniques of this disclosure. For example, at least one of rotor discs 36 and/or at least one of stator discs 38 may be formed from a C—C composite substrate including an antioxidant coating formed on at least a portion of the surface by depositing the antioxidant material via a print head of a three-dimensional printer. Rotor discs 36 and stator discs 38 may be formed of the same materials or different materials. For example, wheel assembly 10 may include metal rotor discs 36 and C—C composite stator discs 38, or vice versa. Further, each disc of the rotor discs 36 and/or each disc of the stator discs 38 may be formed of the same materials or at least one disc of rotor discs 36 and/or stator discs 38 may be formed of a different material than at least one other disc of the rotor discs 36 and/or stator discs 38.

As briefly noted, in some examples, rotor discs 36 and stator discs 38 may be mounted in wheel assembly 10 by beam keys 40 and splines 44, respectively. In some examples, beam keys 40 may be circumferentially spaced about an inner portion of wheel hub 20. Beam keys 40 may, for example, be shaped with opposing ends (e.g., opposite sides of a rectangular) and may have one end mechanically affixed to an inner portion of wheel hub 20 and an opposite end mechanically affixed to an outer portion of wheel hub 20. Beam keys 40 may be integrally formed with wheel hub 20 or may be separate from and mechanically affixed to wheel hub 20, e.g., to provide a thermal barrier between rotor discs 36 and wheel hub 20. Toward that end, in different examples, wheel assembly 10 may include a heat shield (not shown) that extends out radially and outwardly surrounds brake stack 16, e.g., to limit thermal transfer between brake stack 16 and wheel 12.

In some examples, splines 44 may be circumferentially spaced about an outer portion of torque tube 42. Splines 44 may, for example, be integrally formed with torque tube 42 or may be separate from and mechanically affixed to torque tube 42. In some examples, splines 44 may define lateral grooves in torque tube 42. As such, stator discs 38 may include a plurality of radially inwardly disposed notches configured to be inserted into a spline.

Because beam keys 40 and splines 44 may be in thermal contact with rotor discs 36 and stator discs 38, respectively, beam keys 40 and/or splines 44 may be made of thermally stable materials including, e.g., those materials discussed above with respect to rotor discs 36 and stator discs 38. Accordingly, in some examples, example techniques of the disclosure may be used to form a beam key and/or spline for wheel assembly 10.

The example assembly 10 shown in FIG. 1 is merely one example. In other examples, assembly 10 and the components of assembly 10 (e.g., wheel 10, actuator assembly 14, brake stack 16, and axle 18) may have another suitable configuration. In addition, in other examples, the C—C composite components described herein may be used to form other structures in addition to, or instead of, one or more of discs 36, 38, keys 40, and spline 44.

Figure 2:
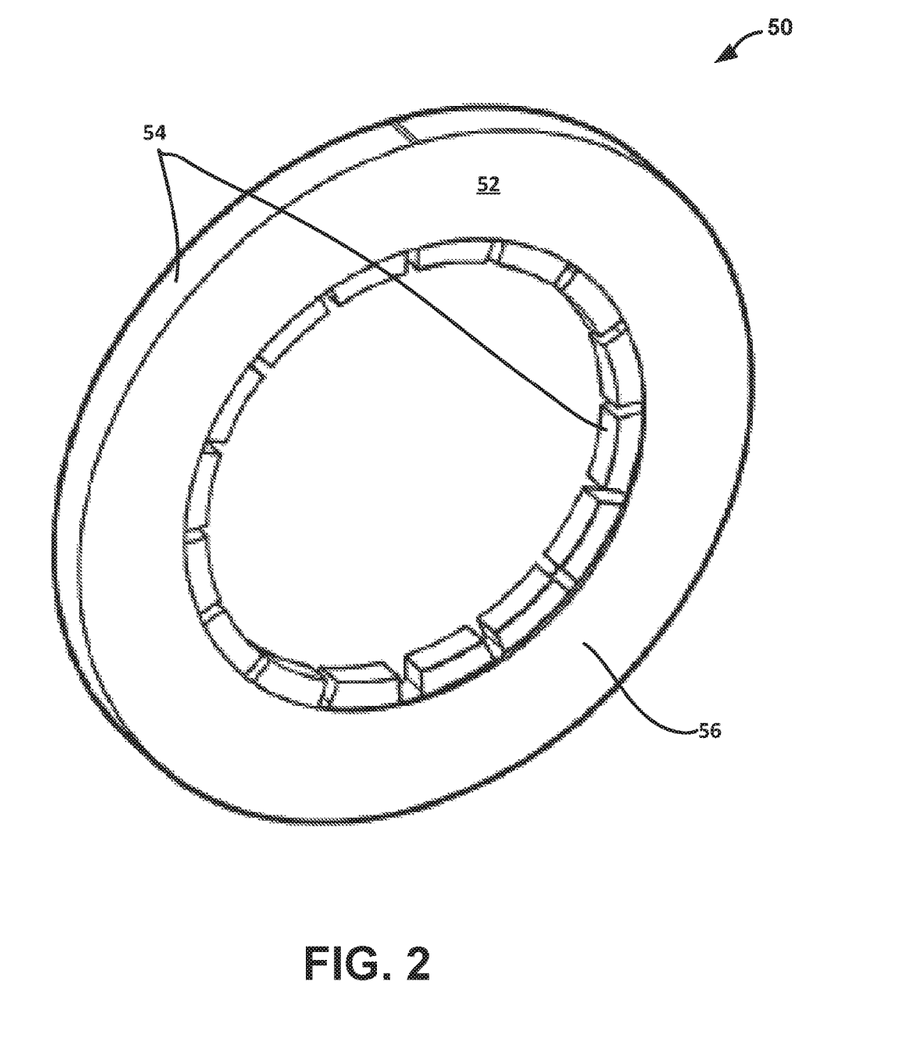
FIG. 2 is a conceptual diagram illustrating an example carbon-carbon composite component.

FIG. 2 is a conceptual diagram illustrating example carbon-carbon composite disc 50 in accordance with aspects of the disclosure. Disc 50 may be an example of rotor discs 36 and stator discs 38 of FIG. 1. As shown, disc 50 includes densified carbon-carbon composite substrate 52 with friction surface regions 56 (also referred to as working surface regions) and non-friction surface regions 54 (or non-working surface regions). Friction surface regions 56 generally correspond to the surface portions of substrate 52 that, unlike non-friction surface regions 54, frictionally engages with an opposing brake disc during a braking operation. The case of disc 50, friction surface regions 56 may correspond to the outer face of the annular ring, and non-friction surface regions 54 may correspond to the outer perimeter surface region and lug regions.

Carbon-carbon composite substrate 50 may be formed using any suitable technique. For example, substrate 50 may be formed by densifying a carbon fiber preform including layers of fabric sheets formed of woven or nonwoven carbon fiber. Densification of the carbon fiber preform may include infiltrating the preform with liquid pitch using vacuum pressure infiltration (VPI) and/or resin transfer molding (RTM) followed by carbonization of the pitch to achieve a C—C composite material exhibiting a desired final density. Additionally or alternatively, chemical vapor infiltration (CVI) or chemical vapor deposition (CVD) may be used to densify the fabric preform. In some examples, densified carbon-carbon composite substrate 52 exhibits a density greater than or equal to approximately 1.7 grams per cubic centimeter (g/cc), such as, e.g., between approximately 1.75 g/cc and approximately 1.90 g/cc.

In some examples of CVD/CVI, the carbonized preform is heated in a retort under the cover of inert gas, such as at a pressure below 100 torr. When the carbonized preform reaches a temperature between about 900 degrees Celsius and about 1200 degrees Celsius, the inert gas is replaced with a carbon-bearing gas such as natural gas, methane, ethane, propane, butane, propylene, or acetylene, or a combination of at least two of these gases. When the carbon-bearing gas flows around and through the carbonized preform, a complex set of dehydrogenation, condensation, and polymerization reactions occur, thereby depositing the carbon atoms within the interior and onto the surface of the carbonized preform. Over time, as more and more of the carbon atoms are deposited onto the surfaces of pores in the carbonized preform, the carbonized preform becomes denser. This process may be referred to as densification, because the open spaces in the carbonized preform are eventually filled with a carbon matrix until generally solid carbon parts are formed. U.S. Patent Application Publication No. 2006/0046059 (Arico et al.), the entire disclosure of which is incorporated herein by reference, provides an overview of example CVD/CVI processing that can be used with the techniques described herein. Although other processing techniques can also be used in other examples to densify substrate 52.

Disc 50 also includes antioxidant coating 58 (not shown in FIG. 2, and shown in FIGS. 5-8) covering non-friction surface regions 54, e.g., to prevent oxidation of the surface and pores of substrate 52 during operation at high temperature. As will be described below, antioxidant coating 58 may be formed by a single individual antioxidant layer or the combination of a plurality of individual antioxidant layers formed by depositing an antioxidant material via print head of a 3D printing device. In the case of a plurality of individually layers, each of the plurality of individual layers may be sequentially formed by depositing the antioxidant material on (either directly on a surface of substrate 52 or indirectly on another previously formed individual antioxidant layer) at least a portion of non-frictional surface region 54 by a print head of a 3D printing device. Throughout the formation of the individual antioxidant layers, the 3D position of the print head may be under automated control to produce antioxidant coating 58 with a desired 3D geometry covering non-frictional surface region 54 of substrate 52.

Any suitable antioxidant material may be used to form the individual layers that combine to form antioxidant coating 58. For example, phosphorus based antioxidation compounds may be applied in a liquid form via a print head of a 3D printing system. Examples of such compounds may be based on phosphoric acid with addition of various metal phosphates, such as, e.g., aluminum phosphate, potassium phosphate, and the like. In some examples, these liquid antioxidation materials may be calcined substantially immediately after application by the print head, e.g., using a high powered spatially concentrated laser beam or another non-contact spatially concentrated heating technique. This process and antioxidant coating may form a penetrant type antioxidant coating 58, e.g., in that the liquid penetrates into the porosity of substrate 52 rather than on the outer surface of substrate 52 as with, e.g., an antioxidant barrier type coating. A penetrant type antioxidant coating deposited via a print head of a 3D device may be considered as defining an antioxidant layer on a surface region of substrate 52. In some examples, antioxidant coating 58 may be formed by depositing a penetrate liquid, allowing the liquid to penetrate the pores of substrate 52, e.g., via capillary action, and then calcined, via a laser or other suitable heating technique. The overall barrier coating 58 may be formed by a single depositing, penetration, and calcination cycle or may be formed from multiple antioxidant layers, e.g., deposited by repeating such a process.

In another example, a liquid containing a mixture of ceramic precursors, such as, e.g., silicon and carbon black, may be deposited by the print head and locally heat treated substantially immediately after deposition, e.g., using a high powered spatially concentrated laser beam or another non-contact spatially concentrated heating technique, to convert silicon and carbon black to silicon carbide. This process may result in a barrier type antioxidation coating, e.g., in that coating 58 is formed on the outer surface of substrate 52 rather than by penetrating into the pores of substrate 52. Again, the overall antioxidant coating 58 may be formed of an individual layer of antioxidant material deposited via the print head and then cured, or by a plurality of individual antioxidant coating over the surface of substrate 52 formed on a layer by layer basis, which may or may not include curing in between the deposition of sequential layers.

Figure 3:
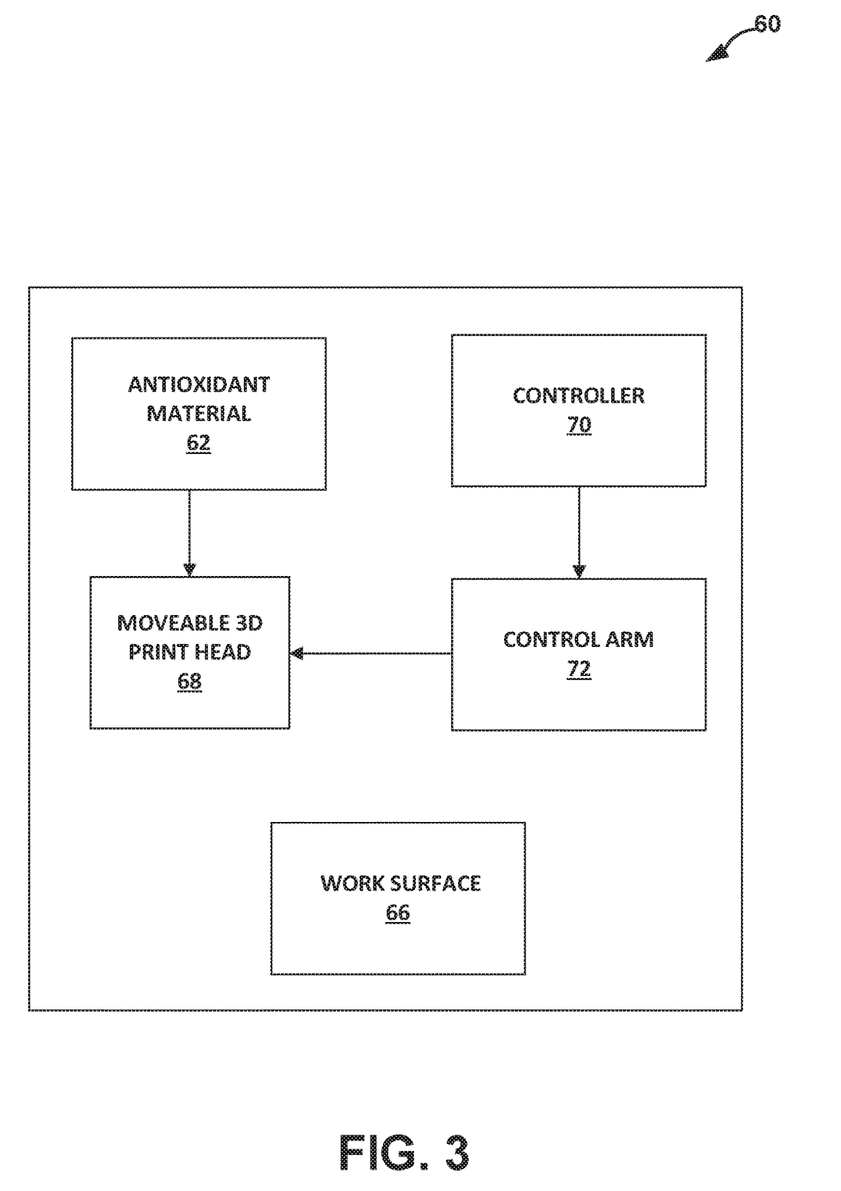
FIG. 3 is a schematic block diagram illustrating an example additive manufacturing system.

FIG. 3 is a schematic diagram illustrating example 3D printing system 60 configured to form antioxidant coating 58 on select surfaces of substrate 52, e.g., on non-frictional surface region 24, via an additive manufacturing process. System 60 may be any suitable 3D printing system configured to deposit antioxidant material 62 via a print head to form antioxidant coating 58 on one or more regions of substrate 52. For ease of description, system 60 is described in terms of an ink jet deposition system. However, other 3D printing systems for forming antioxidant coating 58 are contemplated, e.g., a 3D printing system configured to deliver a metered amount of an antioxidant material (e.g., a liquid) to a relatively precise location on substrate 52 may be used.

As shown, system 60 includes antioxidant material 62 that is fed in liquid form to moveable print head 68, which may take the form of an inkjet print head. Print head 68 may include one or more apertures through which the antioxidant liquid is forced out of during the 3D printing process (e.g., by applying a high pressure). The antioxidant material may be deposited out of print head 68 as a substantially continuous or discontinuous stream on a substantially continuous or discontinuous basis.

The antioxidant material flowing out of printer head 68 may be directed towards work surface 66, where composite substrate 52 may be secured during the deposition process. Antioxidant material 62 flowing out of print head 52 may be directed to a desired position on the surface of substrate 52 to form a layer of antioxidant material from the deposited antioxidant material. The antioxidant material may be deposited directly on the surface of substrate 12 or may be deposited indirectly on the surface, e.g., on a previously formed layer of antioxidant material on the surface of substrate 12. The deposited antioxidant material may be calcined or heat cured (depending on the type of antioxidant material 62) to form a solid layer of composite material, and the process may be repeated by adjusting the position of print head 68 in three-dimensions above work surface 66, which may support substrate 52 throughout the 3D printing process.

Figure 5:
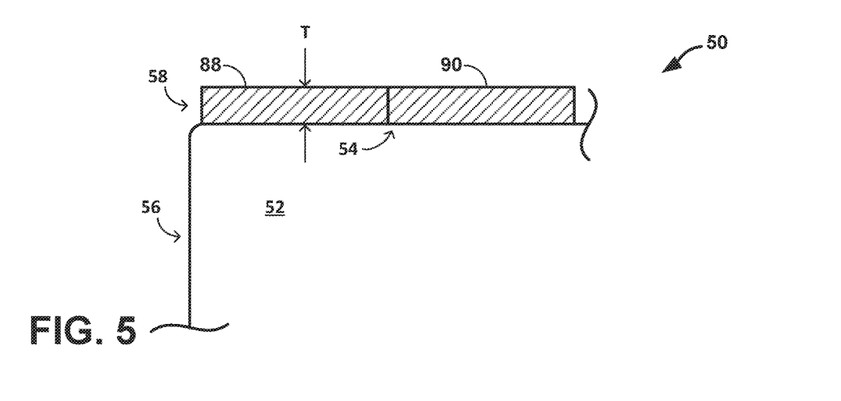
FIGS. 5-7 are conceptual diagram illustrating various partial cross-sections of example carbon-carbon composite components including an antioxidant coating.

In the example illustrated in FIG. 5, system 60 includes controller 70, which may control operation of system 60 during the deposition and formation of antioxidant coating 58 on one or more non-friction surface regions of substrate 52. For example, during deposition, controller 70 may control the movement of control arm 72, which is attached to moveable print head 68, to control the position of moveable print head 68 relative to composite substrate 52 as secured on work surface 66. Print head 68 may be moveable in each of the x, y, and z-directions. In this manner, controller 70 may control the position of moveable print head 68 in three dimensions relative to composite substrate 52 such that the antioxidant material 62 exiting out of print head 68 forms individual layers of antioxidant material over a desired surface region of substrate 12. Additionally or alternatively, controller 70 may control the position of print head 68 relative work surface 66 by moving work surface 66 rather than keeping it stationary during the deposition process.

In some examples, controller 70 may control the formation of the individual layers of antioxidant material such that combination of all the individual layers forms an antioxidant coating that exhibits a desirable three-dimensional geometry and/or covers the desired surface regions (e.g., non-friction surface regions) of substrate 52. In some examples, stepper motors, servo motors, or other suitable devices may be employed to move print head 68 and adjust the flow of antioxidant material 62 out of print head 68.

Additionally, controller 70 may control one or more other parameters of the additive deposition process. Example parameters that may be controlled during the 3D printing process, e.g., via controller 70, may include the location of the deposited liquid on substrate 52, liquid antioxidant material 62 and substrate temperature at the time of deposition, the amount of deposited liquid antioxidant 62, speed of print head 68 motion in 3D, the location on substrate 52 at which a laser or similar heating device heats the antioxidant material 62, and/or temperature of antioxidant material 62 heated by laser or other heating device. In the case of a penetrant type coating, for example, controller 70 may control the metering of antioxidant material 62 so that the proper amount of antioxidant to be absorbed by the porosity is delivered. For example, smaller amounts of antioxidant 62 may be deposited and drawn in by capillary action and cured. In some examples, additional antioxidant 62 may then be deposited over substantially the same surface region (e.g., identical surface area or nearly identical surface area), drawn into the porosity, and cured. A similar process may be used to form a barrier type coating but without substantial penetration of antioxidant 62 into the porosity, e.g., based on the type of antioxidant material 62 employed.

In some examples, controller 70 may include a microprocessor or multiple microprocessors capable of executing and/or outputting command signals in response to received and/or stored data. Controller 70 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. Controller 70 may include computer-readable storage, such as read-only memories (ROM), random-access memories (RAM), and/or flash memories, or any other components for running an application and processing data for controlling operations associated with system 60. Thus, in some examples, controller 70 may include instructions and/or data stored as hardware, software, and/or firmware within the one or more memories, storage devices, and/or microprocessors. In some examples, controller 70 may control print head 68 using a computer-aided manufacturing (CAM) software package running on a microcontroller. Controller 60 may include multiple controllers or only a single controller.

Figure 6:
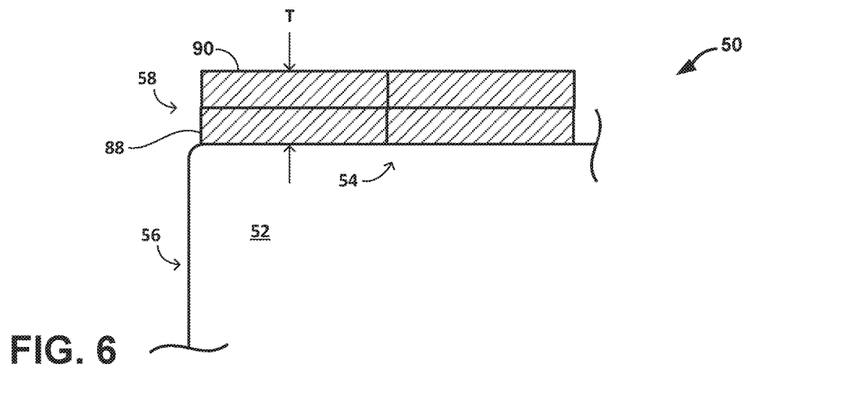
Figure 7:
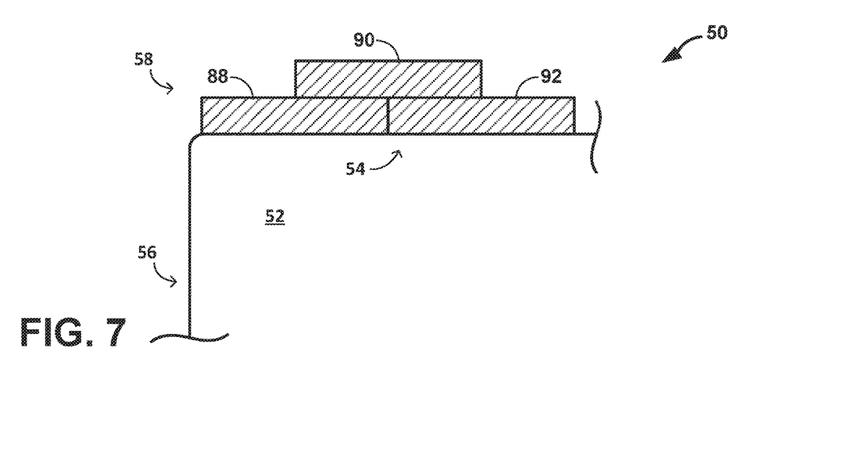

FIGS. 5-7 are conceptual diagram illustrating various partial cross-sections of carbon-carbon composite component 50 including antioxidant coating 58 on non-friction surface region 54 of substrate 52 but not on friction surface region 56 of substrate 52. In particular, the partial cross-sections are representative of the outer perimeter of substrate 52 at the edge interface between the outer perimeter surface region (which corresponds to non-friction surface region 54) and the outer face (which corresponds to friction surface region 56) of annular ring-shaped substrate 52. In each case, antioxidant coating 58 is defined by the combination of a plurality of individual layers of antioxidant material. Examples of the plurality of individual layers of antioxidant material include first layer 88 and second layer 90 each formed directly or indirectly on a respective portion of non-friction surface region 54.

For ease of illustration, the examples of FIGS. 5-7 are described and shown as barrier type antioxidant coating in which coating 58 and individual layers form a coating with a measurable thickness on the outer surface of substrate 52 rather than into the porosity of substrate 52. However, the configuration and deposition technique described may be employed to form a penetrant type antioxidant coating into the porosity of substrate 52. In some examples, antioxidant coating 58 may be formed by a combination of penetrant type antioxidant coating and barrier type antioxidant coating.

As described herein, each individual layer of antioxidant material defining antioxidant coating 58, including first layer 88 and second layer 90, may be formed by depositing antioxidant material via a print head of a 3D printing system, such as, e.g., print head 68 of 3D printing system 60. In the example shown in FIG. 5, first layer 88 is formed directly on a portion of non-friction surface 54 and second layer 90 is formed directly on another adjacent but separate portion of non-friction surface 54. Conversely, in FIG. 6, first layer 88 and second layer 90 are formed entirely on substantially the same portion of non-friction surface 54, with first layer 88 formed directly on non-friction surface 54 and second layer 90 is stacked on top of first layer 88 such that second layer 88 is formed indirectly on non-friction surface 54.

As another configuration, in FIG. 7, first layer 88 and second layer 90 are deposited on portions of non-friction surface 54 that only partially overlap each other. As shown, first layer 88 formed directly on non-friction surface 54. Second layer 90 is subsequently formed indirectly on non-friction surface 54 with a portion overlapping first layer 88 and another portion overlapping another individual layer 92 of antioxidant material. In another embodiment, second layer 90 may be formed such that a portion is directly on first layer 88 and another portion is directly on non-friction surface 54.

First layer 88, second layer 90, and any additional individual layers of antioxidant material deposited via a print head of a 3D printing device (e.g., print head 68 of device 60) on substrate 52 may combine to form antioxidant coating 58 on non-friction surface with any desirable 3D geometry. In general, antioxidant coating 58 may be formed in a manner that protects non-friction surface 54 from oxidation (e.g., during high temperature operation of component 50). Although FIGS. 5-7 show antioxidant coating 58 as covering only a portion of non-friction surface 54, in other examples, antioxidant coating 58 may cover substantially all of non-friction surface 54 of carbon-carbon composite substrate 52. Additionally, examples of the present disclosure are not limited to forming an antioxidant coating on non-friction surfaces using the techniques described herein. For example, an antioxidant coating may formed on any surface of a component, such as, e.g., a carbon-carbon composite component, over which it is desirable to reduce or even oxidization of the underlying portion of the component.

Antioxidant coating 58 may have any desired thickness, as defined by the plurality of individual layers of antioxidant material deposited via print head 86, on non-friction surface 54. For example, in the example of FIG. 6, antioxidant coating 58 exhibits a thickness (T), which is defined by the combination first layer 88 and second layer 90. The thickness of antioxidant coating 58 may be suitable to provide protection against the oxidation of the covered portion of substrate 52. In some examples, the thickness of antioxidant coating 58 may be approximately 2 microns to approximately 30 microns, such as, e.g., approximately 8 microns to approximately 15 microns, or approximately 5 microns to approximately 30 microns. In some examples, the thickness of antioxidant coating 58 may be greater than or equal to approximately 5 microns. The thickness of antioxidant coating 58 may be substantially uniform or may vary.

Additionally, the thickness of antioxidant coating 58 may be defined by any suitable number of individual layers of antioxidant material deposited via 3D print head 68. For example, as shown in FIG. 5, the thickness (T) of antioxidant coating 58 over non-friction surface 54 may be defined by a single layer of antioxidant material (first layer 88 and second layer 90). Alternatively, the thickness (T) of antioxidant coating 58 may be defined by a plurality of individual layers stacked on each other, e.g., as shown in FIG. 6. In some examples, the thickness of antioxidant coating 58 may be defined by a plurality of individual layers of antioxidant material stacked on each other, where the total number of layers ranges from approximately one to approximately 20, such as, e.g., approximately 3 to approximately seven, or greater than or equal to approximately 5. The thickness of each individual layer (e.g., first layer 88 or second layer 90) may range from approximately one micron and approximately 10 microns, such as, e.g., between approximately 5 microns and approximately 10 microns, or greater than or equal to approximately 7 microns.

Although non-friction surface 54 is shown in FIGS. 5-7 as being substantially level (e.g., defining a planar surface or an otherwise smooth surface), in other examples, non-friction surface 54 exhibits one or more 3D features, e.g., channels into the surface plane or protrusion out of the surface plane. The use of 3D printing to form antioxidant coating 58 may allow for the carbon-carbon composite substrate with such complex geometries to accommodate such variations in the surface defined by non-friction surface 54, e.g., while still maintaining a substantially uniform coating.

Of course, as described above, not all types of antioxidant coatings form layers of measurable thickness on the outer surface 58 of substrate. For example, penetrant type coatings, e.g., phosphorus based coatings, may be formed that penetrate a relatively considerable depth into the porosity of substrate 52 and end up chemically bound to the carbon molecules. Thus, while such a coating may include one or a plurality of individual layers, the individual layers and overall antioxidant coating 58 may not exhibit a thickness extending above the outer surface of substrate 52.

Figure 4:
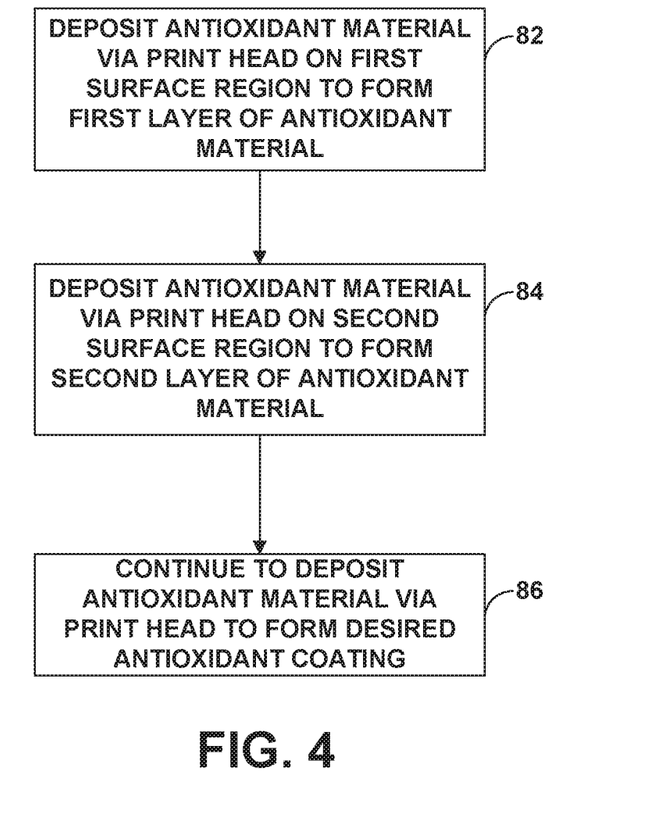
FIG. 4 is a flow diagram illustrating an example method of forming a carbon-carbon composite component including an antioxidant coating in accordance with aspects of this disclosure.

FIG. 4 is a flow diagram illustrating an example technique of forming antioxidant coating 58 on non-friction surface 54 of carbon-carbon composite substrate 52, e.g., in the configurations shown in any one or more of FIGS. 5-7. For ease of illustration, the example of FIG. 4 is described as being performed via system 60 of FIG. 3. However, other systems may be used to carry out the additive manufacturing of carbon preform 50 in other examples.

As shown, print head 68 deposits antioxidant material 62 on a first portion of non-friction surface 54 to define first layer of antioxidant material 88 on substrate 52 (82). Controller 70 may control the position of print head 68, flow rate of the antioxidant material and/or other desired parameter throughout the process, e.g., to provide for a desired layer geometry and/or position over surface region of substrate 52. Controller 70 may control print head 68 to deposit antioxidant material 62 on a substantially continuous or discontinuous basis.

While or after the antioxidant material of first layer 88 has been heat cured, calcined or otherwise solidified, print head 68 may deposit antioxidant material 62 on a portion of non-friction surface 54 to define second layer of antioxidant material 90 on substrate 52 (84). Again, controller 70 may control the position of print head 68, flow rate, and/or other desired parameter of the antioxidant material throughout the process to provide for a desired layer of antioxidant material on substrate 52, and may control print head 68 to deposit the antioxidant material on a substantially continuous or discontinuous basis. Such a process may continue until a plurality of individual layers of antioxidant material are formed such that the combination of individual layers defines antioxidant coating 58 having the desired configuration (e.g., geometry and/or shape) as desired on non-friction surface 54 of substrate 52 (86). For example, in the case of a penetrant type antioxidant coating 58, coating 58 may substantially completely cover the carbon surface of substrate 52 to a certain penetration depth and then chemically bind with the carbon while a barrier type of antioxidant coating 58 form a substantially continuous layer over surface of substrate 52 with substantially no cracks (e.g., no cracks or nearly no cracks, such that the structural integrity of substrate 52 is maintained). These properties may be controlled by proper formulation of the antioxidant system and by tuning the 3D printing parameters to each type of antioxidant system.

In some cases, it may be beneficial to vary the composition of the antioxidant material during application. For example, a first layer (or the first several layers) may be a penetrant type antioxidant material, followed by a layer or multiple layers of barrier type antioxidant material for relatively high protection. Or, alternatively, several layers of barrier type AO may be deposited, followed by several layers of penetrant type to seal any potential cracks in the barrier coat.

In some examples, antioxidant coating 58 may undergo post application heat treatment. Such application may be done in a furnace after the antioxidant coating is formed is through 3D printing or it could be done in-situ immediately after the liquid antioxidant is deposited by the printing head.

Examples of different techniques for forming antioxidant coatings on, e.g., carbon-carbon composite materials have been described. In different examples, techniques of the disclosure may be implemented in different hardware, software, firmware or any combination thereof. In some examples, techniques of the disclosure may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. In some examples, techniques of the disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method for forming a carbon-carbon composite component including an antioxidant coating, the method comprising:
    depositing an antioxidant material on a first surface region of a carbon-carbon composite substrate via a print head of a three-dimensional printing device to form a first layer of the antioxidant material on the first surface region of the substrate; and
    after forming the first layer, depositing the antioxidant material on a second surface region of the substrate via the print head of the three-dimensional printing device to form a second layer of the antioxidant material on the second surface region, wherein the antioxidant material comprises at least one of a phosphorus based antioxidation compound or a ceramic precursor compound, and wherein the antioxidant coating comprises the first layer and the second layer of the antioxidant material.

2. The method of claim 1, wherein the first layer comprises a penetrant type layer of antioxidant material.

3. The method of claim 1, wherein the first layer comprises a barrier type layer of antioxidant material.

4. The method of claim 1, wherein at least a portion of the second layer overlaps a portion of the first layer.

5. The method of claim 1, wherein the antioxidant coating includes a plurality of individual layers of the antioxidant material, including the first layer and second layer, defining an overall thickness of the antioxidant coating of approximately 2 microns to approximately 30 microns.

6. The method of claim 1, wherein the first layer and the second layer each define a thickness between approximately one micron and approximately 10 microns.

7. The method of claim 1, further comprising leaving a third surface region of the substrate not covered with antioxidant material, wherein the first surface region and the second surface region of the substrate comprise non-friction surface regions of the substrate, and the third surface region of the substrate comprises a friction surface of the substrate.

8. The method of claim 1, wherein the carbon-carbon composite material exhibits a density greater than or equal to approximately 1.7 grams per cubic centimeter.

9. The method of claim 1, further comprising densifying a carbonized carbon fiber preform to form the carbon-carbon composite material prior to depositing the antioxidant material.

10. The method of claim 1, wherein the first layer is positioned between the second layer and the carbon-carbon composite substrate.

11. The method of claim 1, wherein the first layer and the second layer are directly adjacent to each other.

12. The method of claim 1, wherein the second layer is positioned directly on the first layer.

13. The method of claim 1, wherein the first surface region and the second surface region of the substrate comprise non-friction surface regions of the substrate.

* * * * *